United States Patent [19]

Osada et al.

[11] 4,320,219

[45] Mar. 16, 1982

[54] POLYMERIZATION OR INORGANIC ELEMENT-CONTAINING MONOMERS USING PLASMA, AND THE FORMED PRODUCT

[75] Inventors: Yoshihito Osada, Mito, Japan; Alexis T. Bell, Oakland; Mitchel M. Shen, Piedmont, both of Calif.

[73] Assignee: The Regents of the University of California, Berkeley, Calif.

[21] Appl. No.: 216,949

[22] Filed: Dec. 15, 1980

Related U.S. Application Data

[60] Division of Ser. No. 44,048, May 31, 1979, Pat. No. 4,279,723, Continuation-in-part of Ser. No. 934,855, Aug. 18, 1978, Pat. No. 4,212,719, and a continuation-in-part of Ser. No. 882,124, Feb. 28, 1978, abandoned.

[51] Int. Cl.$^3$ .................. C01B 35/16; C08F 2/52; C08G 79/02
[52] U.S. Cl. ................ 528/4 AD; 204/164; 204/165; 423/276
[58] Field of Search .............. 204/164, 165; 423/276 X; 528/4

[56] References Cited

U.S. PATENT DOCUMENTS

| | | | |
|---|---|---|---|
| 2,555,512 | 6/1951 | Schlesinger et al. | 204/164 |
| 3,373,001 | 3/1968 | Drinkard | 423/276 |
| 4,235,987 | 11/1980 | Peters | 528/4 |

OTHER PUBLICATIONS

Vasile et al., J. Electrochem. Soc., vol. 119, No. 4, (Apr. 1972), pp. 451–455.
Tkachuk et al., Polymer Science, USSR, vol. 16, No. 7, (1974), pp. 1860–1869.

*Primary Examiner*—Howard S. Williams
*Attorney, Agent, or Firm*—Flehr, Hohbach, Test, Albritton & Herbert

[57] ABSTRACT

An ionized gas plasma is established in an electrical field in contact with a non-vapor volume monomer (liquid and/or solid). The plasma causes polymerization of the monomers which are of the phosphazene or carborane type.

7 Claims, No Drawings

POLYMERIZATION OR INORGANIC ELEMENT-CONTAINING MONOMERS USING PLASMA, AND THE FORMED PRODUCT

CROSS-REFERENCE TO RELATED APPLICATIONS

This is a division of application Ser. No. 44,048 filed May 31, 1979, now U.S. Pat. No. 4,279,723.

This application is also a continuation-in-part of our copending patent applications, Ser. No. 934,855, filed Aug. 18, 1978, now U.S. Pat. No. 4,212,719, entitled "A Method of Plasma Initiated Polymerization", and of its parent application, Ser. No. 882,124, filed Feb. 28, 1978, now abandoned, of the same title.

BACKGROUND OF THE INVENTION

Application of an electric field to a gas, generally of a vacuum, to form a plasma of gas ions is a known technique for use in the polymerization of a variety of monomers. This technique has been described, for example, in Luster U.S. Pat. No. 2,257,177, Tobin U.S. Pat. No. 3,287,242, and a variety of other patents.

The class of phosphazene and carborane polymers are of potential practical importance because of their high temperature stability. In the past, techniques other than plasma polymerization have been employed to form polymers from phosphazene monomers. For example, heat, gamma rays, x-rays, and high energy electron excitation have been employed for this purpose. These techniques are not desirable because of the relatively high energy and power consumption required for polymerization. In addition, the yields by such polymerization techniques are relatively low. Carborane monomers have been copolymerized with other monomers such as organsiloxanes by the technique of condensation polymerization. However, there is no technique in the prior art which permits homopolymerization.

SUMMARY OF THE INVENTION AND OBJECTS

In accordance with the present invention, polymerization of a non-vapor phase (liquid and/or solid) monomer is accomplished by polymerization as the result of contact with an ionized gas plasma. The monomers are of the phosphazene or carborane form both of which are crystalline solids under ambient conditions and in their structural formulae include the inorganic elements phosphorus or boron in the repeating units of the polymer. Such polymers have exceptional high temperature stability.

It is an object of the invention to provide a versatile ionized gas plasma polymerization technique of low power input for the polymerization of phosphazene or carborane monomers.

It is a further object of the invention to provide a technique of the foregoing type capable of homopolymerizing carborane.

It is another object of the invention to provide a method of the foregoing type capable of relatively high polymer yields.

Other objects and features of the invention will be apparent from the following description of the preferred embodiments.

DETAILED DESCRIPTION OF THE PREFERRED EMBODIMENTS

The principle of the present invention is to polymerize a specific class of two related polymers by the use of a non-equilibrium ionized gas plasma. The formation of the ionized gas plasma (herein plasma) is set out in detail in our parent applications. Such formation may be accomplished by any known technique, for example, see J. R. Hollahan and A. T. Bell, eds., "Techniques and Applications of Plasma Chemistry", Wiley, New York, 1974 and M. Shen, ed. "Plasma Chemistry of Polymers", Dekker, New York, 1976. In one technique, an ionizable gas is contained under vacuum between parallel plate electrodes connected to a radio frequency generator which is sold by International Plasma Corporation under the designation "Model 3001". The plasma can be created with such parallel plates either external or internal to the vacuum chamber. In another technique, an external induction coil creates an electric field which produces the plasma. In yet another technique, oppositely charged electrode points are placed directly into the vacuum chamber in spaced apart relationship to create the plasma. The present invention is applicable to any plasma formed by these techniques or any other one in which an electric field creates a path of electrical conduction within the gas phase.

The operating parameters for the plasma vary from monomer to monomer. In general, it is preferable to employ reduced gas pressure to form a glow discharge by electron liberation which causes ionization in the gas phase. The power requirements of the system are relatively low, on the order of 10 to 1000 watts. In addition, the energy of the plasma is at an order to magnitude lower than that of so-called high energy polymerization techniques such as electron beams, gamma rays, and x-rays. Thus, for example, the energy of electrons in the plasma is substantially less than 100 eV and typically on the order of 1–10 eV on the average.

It has been found that plasma contact on the order of 10 minutes to 10 hours is sufficient for plasma polymerization to relatively high conversion. In an optional subsequent procedure, the polymer formed during the plasma polymerization may be heated to an elevated temperature during which polymerization continues to a higher degree of conversion. This step, termed "postpolymerization", should be performed at a temperature sufficient to melt the solid crystalline monomer. For example, for hexochlorocyclotriphosphazene monomers, this postpolymerization may be carried out on the order of 120° to 140° C., above the melting point of formed polymers. Suitable postpolymerization times may range from 1 hour to 24 hours or more. Postpolymerization is less satisfactory for carborane polymers formed by plasma polymerization. This is because such polymers have relatively high melting points, e.g., 290° C.

Where a plasma is created in a chamber including a monomer gas at a pressure below atmospheric pressure, the plasma is formed when the interelectrode potential exceeds a threshold value which is sufficient to ionize or "breakdown" the gas. This is a function of the composition of the gas, its pressure and the distance between the electrodes. After breakdown, the gas is conductive and a stable plasma may be maintained over a wide range of currents. Although the exact composition of the plasma is now known, it includes electrons, ions, free radicals, and other reactive species.

The present polymerization technique is applicable to ring-type monomers of the phosphazene or carborane class. Such compounds are related in that they include inorganic elements (phosphorus or boron) as part of a repeating unit of the polymer. Also, they are in the solid crystalline form at room temperature and are characterized by high temperature stability.

THE PHOSPHAZENE EMBODIMENT

The term "phosphazene monomer" refers to a ring compound including

repeating units in a ring. The term "monomer" includes polymerizable trimers, tetramers and pentamers. One particularly suitable phosphazene monomer is the dichlorophosphazene trimer termed "hexachlorocyclotriphosphazene". That product may be structurally represented by the following formula where n=3.

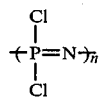
(1)

In the monomer, other halogen groups (fluoride and bromide) may be substituted for the chloride group. In addition, organofunctional groups such as OR, NHR, $NR_2$, or R may be substituted, wherein R is an aliphatic or aromatic group. Such substitution may occur prior or subsequent to polymerization. Thus, the formula (1) monomer may be plasma polymerized followed by substitution of the organic radicals for the halogens in the polymer by conventional chemical techniques. Alternatively, such substitution may be made in the monomer prior to polymerization.

A large and expanding number of poly(organophosphazenes) have been synthesized by the reaction of poly(dichlorophosphazene) with alkoxides, arlyoxides, or amines. Poly(organophosphazenes) of this type include poly[bis(trifluoroethoxy)phosphazene], poly[bis(4-methylphenoxy)phosphazene], and poly[bis-(4-methoxanilino)phosphazene].

The phosphazene polymer is defined in the manner of the foregoing monomer with the exception that the number of repeating units (n) is at least 9. Thus, the preferred phosphazene polymer product may be defined by the following generalized structural formula:

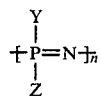
(2)

wherein n = the number of repeating units, and y and z are selected from the group consisting of chloride, bromide, fluoride, and OR, NHR, $NR_2$, or R, wherein R is an aliphatic or aromatic group, and mixtures thereof.

Plasma polymerization of phosphazenes without post-polymerization produce relatively high conversions of monomer to polymer at times of 10 to 30 minutes. For example, conversion percentages of from 15 to 60% or more are obtainable. Postpolymerization at elevated temperatures does not appear to increase such conversion percentages.

The phosphazene monomer may be plasma polymerized as homopolymers or copolymerized with other phosphazene polymers or with totally different monomers. The polymers formed only from phosphazene monomers are characterized by excellent high temperature stability. Also, they are characterized by a relatively high viscosity at elevated temperatures. Other monomers such as 1,3,5-triazine, s-triazoborane and 1-H-1,2,4-triazole may be similarly polymerized.

CARBORANES

Carborane monomers are generally crystalline solids at room temperature. Three specific structural formula of such monomers are as follows:

$C_{1-2}B_nH_{n+2}$ for closo (cage) structures; (3)
$C_{1-4}B_nH_{n+4}$ for nido (nest) structures; and
$C_{1-6}B_nH_{n+6}$ for anachno (web) structures; where n is generally in the range of 3–10.

Suitable carboranes are one or more monomers of the foregoing structural formula.

It has been found that carboranes may be homopolymerized by the foregoing technique of plasma polymerization of phosphazene monomer. In addition, two or more carboranes may be copolymerized. Furthermore, other monomers such as organosilanes, including dimethyldichlorosilane, dimethylsilanediol, phenylmethyldichlorosilane, and trifluoromethyldichlorosilane, may be copolymerized together with the carboranes.

Suitable nido-carboranes include $CB_5H_9$, $C_2B_4H_8$, $C_3B_3H_7$, $C_4B_2H_6$, and the like. Suitable closo-carboranes structures include $1,5\text{-}C_2B_3H_5$, $1,6\text{-}C_2B_4H_6$, $2,4\text{-}C_2B_4H_7$, $C_2B_6H_8$, $C_2B_7H_9$, $1,10\text{-}C_2B_8H_{10}$, $C_2B_9H_{11}$, $1,7\text{-}C_2B_{10}H_{12}$, and ortho-$1,10\text{-}C_2B_{10}H_{12}$. Particularly effective polymers are produced with the last named monomer, commonly referred to as o-carborane.

The carborane homopolymer produced from the foregoing ring compounds are characterized by structural formula (3) with the exception that the number of repeating units is at least 3.

Relatively high yields are obtained by plasma polymerization of carboranes. For example, conversions for o-carborane are expected to be from 25 to 50% or more.

Poly(o-carborane) polymer is characterized by high temperature stability. For example, it does not decompose at temperatures as high as 800° C. It is characterized by insolubility in benzene to form a white film which is insoluble in most organic solvents.

The conditions of plasma polymerization are generally the same as those of plasma polymerization of the phosphazenes. Thus, the plasma may be formed in the foregoing manner. Also, suitable plasma contact times are on the order of 10 minutes to an hour. Because of their high melting points, postpolymerization of the polymers in the molten state are not deemed to be practical except for highly specialized end uses.

It is noted that for both the phosphazenes and carboranes, there is considerable flexibility with respect to the degree of cross-linking which may be obtained in the resultant product. Thus, depending upon the desired end use, the product may be relatively straight chained or include a high degree of cross-linking depending upon the conditions and the particular monomers employed.

A further disclosure of the nature of the present invention is provided by the following specific examples of its practice. It should be understood that the data disclosed serve only as examples and are not intended to limit the scope of the invention.

EXAMPLE 1

The above technique was employed for the polymerization of hexachlorocyclotriphosphazene in accordance with the following conditions. This solid crystalline monomer was sealed in a glass tube after degassing at $10^{-3}$ to $10^{-4}$ torr., and subsequently frozen in liquid nitrogen. The glass tube was then inserted between a pair of external parallel plate electrodes connected to an International Plasma Corporation Model 3001 radiofrequency generator which operates at 13.56 MHz frequency and delivers up to 150 watts power. A glow discharge was then generated for 30 minutes at 50–120 watts at room temperature. The vapor pressure inside the tube was controlled through a stopcock to sustain the plasma. The surface of exposure to the plasma, a portion of the solid monomer surface became molten and increased viscosity during plasma contact. The plasma was then terminated and the product was extracted in warm solvent (1,1′, 2,2′-tetrachloroethane) with stirring for about 1 to 5 hours. The resulting polymer was cross-linked and exhibited a rubber-like property. The polymer yield or conversion ratio was on the order of 10%.

EXAMPLE 2

The monomer of Example 1 was polymerized by the technique of that Example except for the following differences. The phosphazene was exposed to the plasma for 3 hours (at 80 watts for the first hour and at 120 watts for the following 2 hours). Then the reaction mixture was allowed to postpolymerize in an oil bath maintained at 210° C. for 15 hours. By way of comparison, the same amount of a phosphazene reference monomer which had not been exposed to the plasma was sealed under vacuum and left standing at the same temperature.

The plasma contacted reaction system exhibited a substantial increase in viscosity (the consistency at 210° C. of a syrup in comparison to the reference which exhibited only a slight increase in viscosity (a consistency at 210° C. of water at room temperature). The polymer did not dissolve in toluene.

The yield of polymer which had been exposed to the reference was about 60% conversion. In contrast, the yield of the reference was less than 5%.

EXAMPLE 3

The o-carborane was polymerized in accordance with the conditions of Example 1.

The glass surface of the tube was gradually covered by a polymer film of increasing thickness as plasma proceeded. The polymer yield was on the order of 10% conversion. The resulting polymer film was white colored, thin and insoluble in most organic solvents. It exhibited excellent thermal stability.

EXAMPLE 4

The procedure of the preceding Example was performed with the exception that the plasma conditions were 50 watts of power at 25 minute duration. In addition, the polymer was postpolymerized at 80° C. for 20 hours.

The resulting polymer conversion was about 25%. Under thermal analysis, the product did not decompose up to 800° C. As with Example 3, the product was insoluble in benezene and most organic solvents and forms into a white film.

What is claimed is:

1. A method for the polymerization of a carborane monomer comprising establishing and maintaining a contained zone of ionized gas plasma at an energy of less than 100 eV by applying an electric field said gas plasma being in contact with the surface of a non-vapor volume of said carborane monomer to cause it to polymerize.

2. The method of claim 1 in which the said carborane polymer product is derived from a monomer selected from the group consisting of $C_{1-2}B_nH_{n+2}$, $C_{1-4}B_nH_{n+4}$, $C_{1-6}B_nH_{n+6}$, and mixtures thereof.

3. The method of claim 1 in which said carborane monomer is copolymerized with an organosilane monomer.

4. The method of claim 1 in which said carborane monomer is homopolymerized.

5. The product formed by the method of claim 4.

6. A carborane homopolymer of at least 3 monomer units.

7. The homopolymer of claim 6 in which said carborane homopolymer is derived from ortho-carborane.

* * * * *